US011681598B2

(12) United States Patent
Sagar et al.

(10) Patent No.: US 11,681,598 B2
(45) Date of Patent: Jun. 20, 2023

(54) METHOD AND APPARATUS TO FACILITATE LOW LATENCY FAULT MITIGATION, QOS MANAGEMENT AND DEBUG OF A PROCESSING PIPELINE

(71) Applicant: Texas Instruments Incorporated, Dallas, TX (US)

(72) Inventors: Rajat Sagar, Allen, TX (US); Niraj Nandan, Plano, TX (US); Kedar Chitnis, Karnataka (IN); Brijesh Jadav, Karnataka (IN); Mihir Mody, Karnataka (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/135,481

(22) Filed: Dec. 28, 2020

(65) Prior Publication Data

US 2021/0326229 A1 Oct. 21, 2021

Related U.S. Application Data

(60) Provisional application No. 63/011,139, filed on Apr. 16, 2020.

(51) Int. Cl.
*G06F 11/00* (2006.01)
*G06F 11/30* (2006.01)
(Continued)

(52) U.S. Cl.
CPC ...... *G06F 11/3027* (2013.01); *G06F 11/0757* (2013.01); *G06F 11/0772* (2013.01); *G06F 11/3072* (2013.01); *G06F 15/7807* (2013.01)

(58) Field of Classification Search
CPC ............ G06F 11/0757; G06F 11/0772; G06F 11/3072; G06F 15/7807; G06F 11/3409;
(Continued)

(56) References Cited

U.S. PATENT DOCUMENTS

| 5,146,466 A | * | 9/1992 | Hamada | ............... H01S 5/32325 257/14 |
| 8,572,299 B2 | * | 10/2013 | Pross | .................... G06F 9/3881 345/503 |

(Continued)

FOREIGN PATENT DOCUMENTS

EP 3506095 A2 7/2019

OTHER PUBLICATIONS

International Search Report for PCT/US2021/027458 dated Aug. 5, 2021.

*Primary Examiner* — Amine Riad
(74) *Attorney, Agent, or Firm* — Michael T. Gabrik; Frank D. Cimino

(57) ABSTRACT

Methods, apparatus, systems and articles of manufacture for an example event processor are disclosed to retrieve an input event and an input event timestamp corresponding to the input event, generate an output event based on the input event and the input event timestamp, in response to determination that an input event threshold is exceeded within a threshold of time, and an anomaly detector to retrieve the output event, determine whether the output event indicates threat to functional safety of a system on a chip, and in response to determining the output event indicates threat to functional safety of the system on a chip, adapt a process for the system on a chip to preserve functional safety.

22 Claims, 10 Drawing Sheets

(51) Int. Cl.
*G06F 15/78* (2006.01)
*G06F 11/07* (2006.01)

(58) Field of Classification Search
CPC ............. G06F 11/3419; G06F 2201/86; G06F 2201/88
See application file for complete search history.

(56) References Cited

U.S. PATENT DOCUMENTS

| | | | |
|---|---|---|---|
| 8,869,160 B2* | 10/2014 | Dillenberger | G06F 9/52 |
| | | | 718/103 |
| 10,754,759 B1* | 8/2020 | Majumdar | G06F 11/3652 |
| 2009/0249122 A1* | 10/2009 | Nadehara | G06F 11/3648 |
| | | | 714/E11.029 |
| 2012/0117413 A1* | 5/2012 | Asaad | G06F 1/10 |
| | | | 713/600 |
| 2019/0004878 A1 | 1/2019 | Adler et al. | |
| 2019/0042378 A1 | 2/2019 | Wouhaybi et al. | |
| 2019/0042801 A1* | 2/2019 | Fender | G06F 1/3206 |
| 2019/0188066 A1* | 6/2019 | Mody | G06F 11/079 |
| 2019/0258251 A1 | 8/2019 | Ditty et al. | |
| 2019/0347152 A1* | 11/2019 | Schardt | G06F 11/0745 |
| 2019/0384578 A1* | 12/2019 | Schardt | G06F 30/331 |
| 2020/0026630 A1* | 1/2020 | Schardt | G06F 11/3024 |
| 2020/0210301 A1* | 7/2020 | Nandan | G06F 11/2236 |
| 2022/0012164 A1* | 1/2022 | Grymel | G06F 11/277 |

* cited by examiner

METHOD AND APPARATUS TO FACILITATE LOW LATENCY FAULT MITIGATION, QOS MANAGEMENT AND DEBUG OF A PROCESSING PIPELINE

RELATED APPLICATION

This patent arises from an application claiming the benefit of U.S. Provisional Patent Application Ser. No. 63/011,139, which was filed on Apr. 16, 2020. U.S. Provisional Patent Application Ser. No. 63/011,139 is hereby incorporated herein by reference in its entirety. Priority to U.S. Provisional Patent Application Ser. No. 63/011,139 is hereby claimed.

FIELD OF THE DISCLOSURE

This disclosure relates generally to processor management, and, more particularly, to a method and apparatus to facilitate low latency fault mitigation, quality of service (QoS) management and debug of a processing pipeline.

BACKGROUND

Oversight of a process operating within a processor has been conducted with software using interrupts that execute at specified times. At the interrupt points, the oversight determines whether the process has achieved the necessary tasks since the most recent interrupt. The software collects processor data and then determines whether any errors or system-wide failures have occurred based on the collected data.

Figure 1:
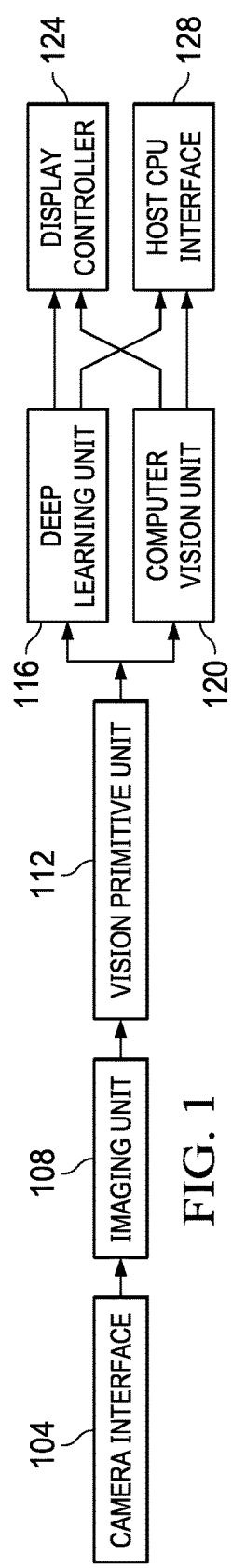
FIG. 1 is a block diagram of an example sensor data flow.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts.

DETAILED DESCRIPTION

Sensor processing includes a wide array of processors, sensors, and controllers that interact to provide solutions in automotive, industrial, medical, consumer, and other applications. In a typical example, a processor takes in sensor data, manipulates the data, and take various actions in response to the data. In some applications deemed safety critical, the processor may be required to perform the processing within a fixed amount of time.

However, when a processor component fails to complete a task in time or at all, prior approaches have had challenges measuring, tracking, and reporting the time taken for the steps that make up the task. For example, software-based timing approaches may run at the system level and, as such, may not have visibility into the lower-level various processing resources, such as individual hardware accelerators (HWA). Thus, software-based timing approaches may not be able to locate a specific point of failure. Furthermore, software-based timing may be inaccurate, may have a long latency, and may overburden the processor. Hardware-based timing may be inflexible and limited to only a few signals within a processing path.

To address these issues and others, a system is provided that includes configurable event processors. Signals of interest can be routed to the event processors and used to control various configurable counters and timers. In this way, transitions in the signals can be timed and reported.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein "substantially real time" refers to occurrence in a near instantaneous manner recognizing there may be real world delays for computing time, transmission, etc. Thus, unless otherwise specified, "substantially real time" refers to real time+−1 second.

FIG. 1 is a block diagram of an example vision data flow on a system on a chip. As shown in FIG. 1, the data flow of a vision pipeline in a system on a chip begins with capture of data by, in some instances, a camera interface 104. In these examples, the data capture could consist of an image, figure, or any other data type.

The captured data is sent for analysis and processing by a set of HWAs such as an imaging unit 108, a vision primitive unit 112, a deep learning unit 116, and a computer vision unit 120.

After analysis and processing, the data is sent to a display controller 124 and to a host CPU interface 128. The display controller 124 could interface to a monitor, television, or other graphical display interface. The host CPU interface 128 provides an interface to facilitate a user action, CPU action, or other action affecting the analyzed data.

Figure 2:
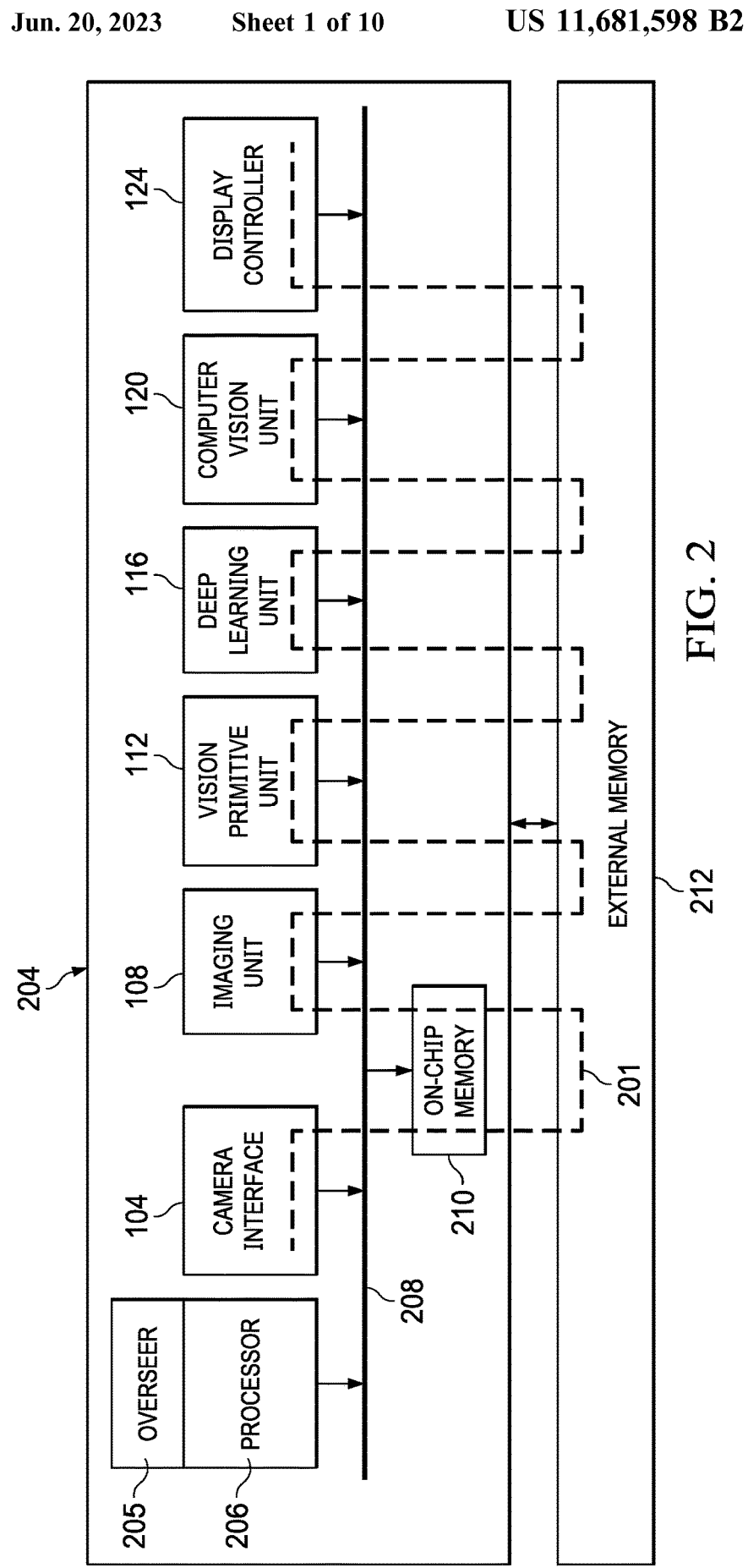
FIG. 2 is a block diagram of an example system on a chip utilizing the sensor processing data flow of FIG. 1.

FIG. 2 is a block diagram of an example sensor processing data flow 201 represented by a line that may be carried out on a system on a chip (SoC) 204. The data flow 201 may be a process that incorporates at least one of the components on the SoC 204. In the approach of FIG. 2, an overseer 205 is implemented on a processor 206. The processor 206 can transmit software events to various components of the SoC 204 via a data bus 208. The software events may be data requests, interrupts, and/or timestamps. The overseer 205 utilizes the software events to determine whether an error or system-wide failure has occurred in the data flow 201.

In this example, the data flow 201 begins with collection of input data by the camera interface 104. In some examples, the input data may be stored in on-chip memory 210 or external memory 212. Various components on the SoC 204 conduct vision processing and analysis on the input data. These components may include, but are not limited to, imaging unit 108, vision primitive unit 112, deep learning unit 116, computer vision unit 120, and display controller 124. In some examples, the various components may save the output data from the analysis or processing to on-chip memory 210 or external memory 212. The overseer 205 may collect information from the various components on the SoC via the processor 206 and data bus 208 through the utilization of data requests and system interrupts. The overseer 205 determines whether an error threshold has been surpassed based on the collected information. The approach detailed above may have a high latency and may require a long time to determine whether an error threshold has been surpassed.

Figure 3:
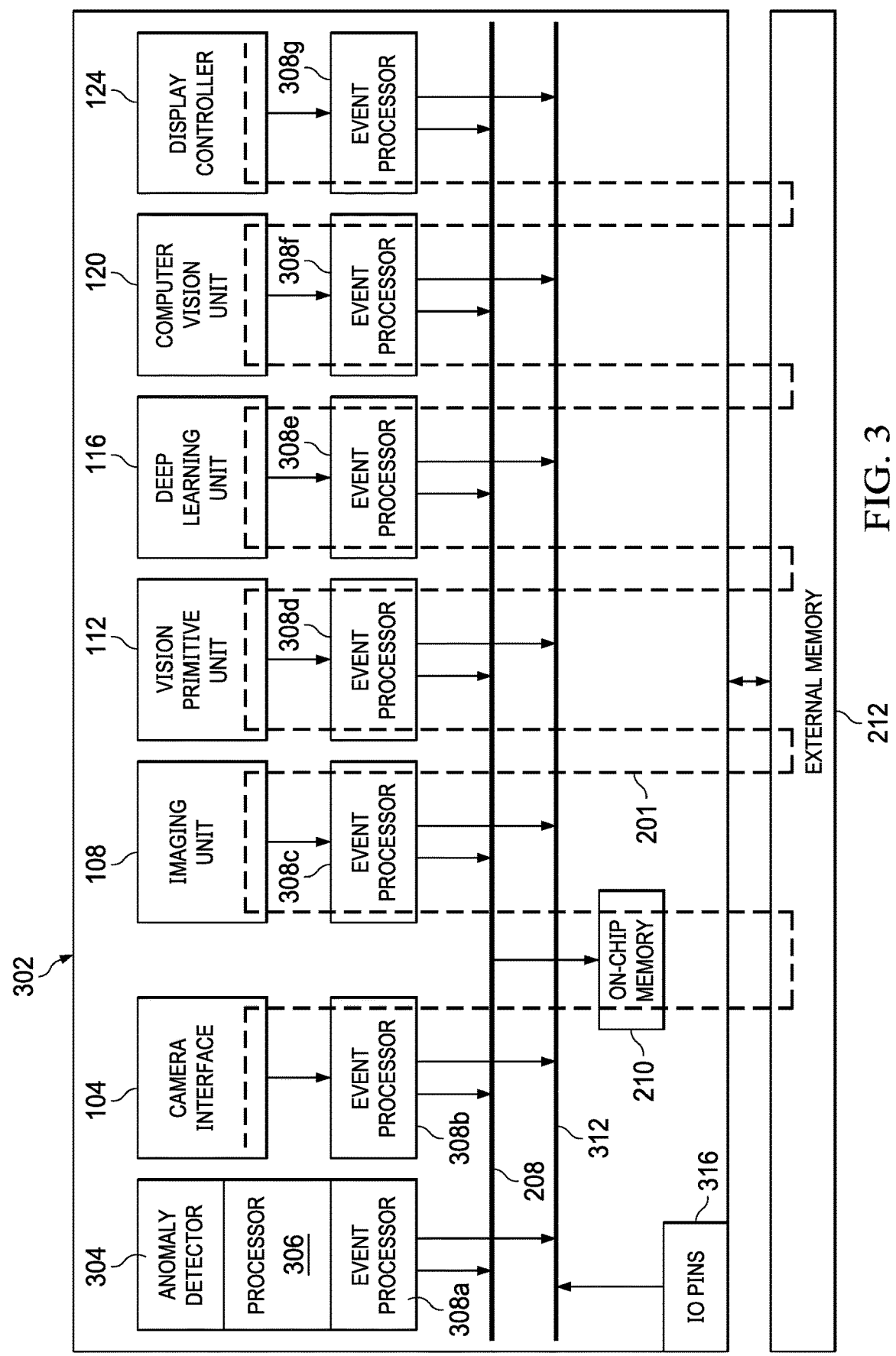
FIG. 3 is a block diagram of a system on a chip including example event processors.

FIG. 3 is a block diagram of an example SoC 302 to facilitate low latency fault mitigation, quality of service (QoS) management and debug of a processing pipeline. The example SoC 302 of FIG. 3 includes a set of HWAs (e.g., the example camera interface 104, the example imaging unit 108, the example vision primitive unit 112, the example deep learning unit 116, the example computer vision unit 120, the example display controller 124, the example data bus 208, and the example on-chip memory 210 similar to those described above). The example SoC 302 of FIG. 3 further includes an example anomaly detector 304, an example processor 306, an example set of event processors 308 (e.g., event processors 308a-g), an example event bus 312, and an example set of Input/Output (IO) pins 316.

In contrast to other examples, such as the SoC 204 of FIG. 2 where events and corresponding errors are detected by a processor 206 monitoring all data flow to and from the HWAs across the bus 208, the SoC 302 provides localized, configurable event detection. In that regard, each of the HWAs includes a corresponding event processor 308b-308g coupled to the respective HWA. The corresponding event processor 308b-308g can be programmably configured to detect events as well as relationships between events in real-time by monitoring the inputs and outputs of the HWA and other signals (such as IO signals received by IO pins 316). This relieves the processor 306 from the burden of actively monitoring the bus 208. When one of the event processors 308b-308g detects an event, it provides a corresponding signal over a dedicated event bus 312, which further relieves the pressure on bus 208. The signal is received by an anomaly detector 304 via its own respective event processor 308, and the anomaly detector 304 determines a response to the event. As the anomaly detector 304 may be a separate resource, this may further reduce the load on processor 306.

In some examples, the anomaly detector 304 receives an output event from the event processor 308a-g via the processor 306 and the example event bus 312 and determines whether the SoC 302 is acting within confines of functional safety or an error and/or system-wide failure has occurred based on the output event. In response to the analysis of the output event, the anomaly detector 304 may alter the usage of at least one of the various components on the SoC 302 to limit future errors from occurring. The anomaly detector 304 may utilize statistics from previous output events to determine the alteration. In these examples, the anomaly detector 304 may determine whether at least one of the components on the SoC 302 is operating above a high risk threshold. In response to determining the at least one component is operating above the high threshold, the anomaly detector 304 may reduce the usage of the at least one component to prevent more errors. In some examples, the anomaly detector 304 may determine whether at least one component on the SoC 302 is operating below a low risk threshold. In response to determining the at least one component is operating below the low risk threshold, the anomaly detector 304 may increase the usage of the at least one component.

The various components of the SoC 302 transmit data to and retrieve data from the data bus 208 via the at least one event processor 308a-g. The at least one event processor 308a-g collects a copy of the data that transmits through the event processor 308a-g and transmits the original data to the original intended destination and analyzes the data copy. The data can include inputs to the components, outputs from the components, external inputs to the SoC 302, outputs from the SoC 302, event statistics, event timestamps, and processing events. The data is not limited to just these examples. An event processor 308a-g may analyze the sample data and determine whether a threshold value has been met. In response to the threshold value being met, the event processor 308a-g generates an output event and transmits the output event to the anomaly detector 304 via the event bus 312.

The transmission of software events between event processors 308a-g and the anomaly detector 304 occurs on the event bus 312 different than the data bus 208 of FIG. 3. Inclusion of the anomaly detector 304, the event processor 308a-g, and the event bus 312 allows for lower latency analysis of anomalies and a quicker reaction time to anomaly detection in the SoC 302 because the anomaly detector 304 can monitor all input and output events form the event processors 308a-g at a regular interval via the dedicated event bus 312. The event bus 312 is dedicated to the transmission of data between the event processors 308a-g and the anomaly detector 304. The event bus 312 allows for the transmission of data between the anomaly detector 304 and the event processors 308a-g to occur much faster than an example SoC not including the event bus 312. A faster transmission results in a reduced latency and faster response to possible errors in the SoC 302. In comparison to the example SoC 204 of FIG. 2, the regular interval is much lower than the interval between interrupts that the SoC 204 utilizes.

The SoC 302 includes IO pins 316. The IO pins 316 may transmit data to the various components on the SoC 302 via the event bus 312. The IO pins 316 may retrieve data from the various components on the SoC 302 via the event bus 312.

In operation, the at least one event processor 308a-g collects a sample of data transmitted through the at least one event processor 308a-g. The at least one event processor 308a-g may create an output event based on the sample of data. The at least one event processor 308a-g transmits the output event to the anomaly detector 304 via the event bus 312 and the processor 306. The anomaly detector 304 retrieves the output event. The anomaly detector 304 determines whether the output event indicates an error or system-wide failure. In response to determining that the output event indicates an error or system-wide failure, the anomaly detector 304 may alter the usage of at least one of the components on the SoC 302.

The components on the SoC 302 that the anomaly detector 304 may alter include, but are not limited to, the camera interface 104, the imaging unit 108, the vision primitive unit 112, the deep learning unit 116, the computer vision unit 120, the display controller 124, the on-chip memory 210, and the processor 306. The anomaly detector 304 may utilize statistics from previous output events to determine how to alter the usage of at least one component on the SoC 302. The statistics provide the anomaly detector 304 with information including the usage of the at least one component on the SoC 302.

Figure 4:
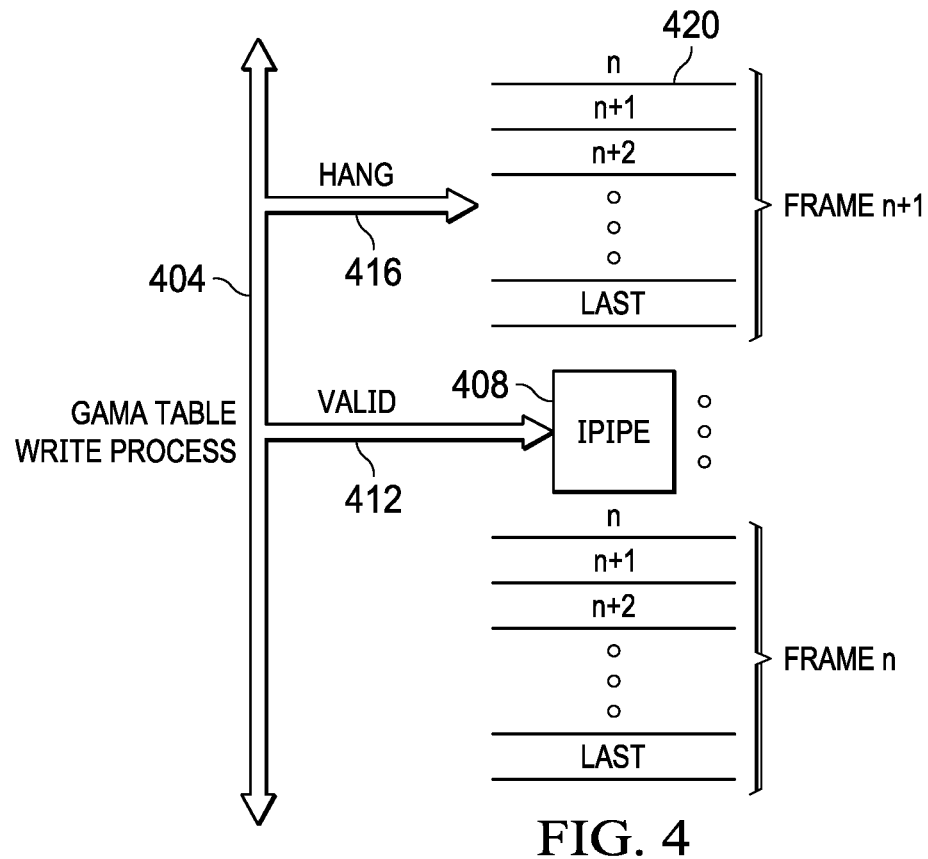
FIG. 4 is an example of a color conversion process utilizing the system on a chip of FIG. 2.

FIG. 4 is an example that may utilize the SoC 204 or SoC 302. The example of FIG. 4 details a process for a pixel processing color conversion pipeline which processes line buffers. A gamma table 404 is used to configure the final gamma after a color conversion process. In this example, the gamma table 404 writes the output to an IPIPE 408. In an ideal instance, the gamma table 404 writes to a location in the IPIPE 408 with a valid write command 412. In an error instance, the gamma table 404 writes a hang command 416 to a region outside the IPIPE 408 in a line buffer zone 420. In these examples, the hang command 416 is a command that causes the system to hang, or malfunction.

In the example of FIG. 2, the overseer 205 may be unable to acquire a clear view during the valid write command 412 and the hang command 416 due to timing margins. In some examples, the overseer 205 is unable to determine that the hang command 416 has occurred before the hang command 416 finalizes or disrupts other processes. In contrast, in the example of FIG. 4, the anomaly detector 304 and event processors 308a-g are able to accurately monitor the hang command 416 because, in an example SoC including the anomaly detector 304 and event processors 308, the gamma table 404 transmits the hang command 416 through example event processors 308a-g. Thus, the event processors 308a-g recognize an error within the hang command 416 and transmits an output to the anomaly detector 304 to be analyzed. Accordingly, while the arrangement of FIG. 2 is limited in ability to detect such errors, the arrangement of FIG. 3 is not limited in the same manner. In response to the information form the event processors 308a-g, the anomaly detector 304 determines the error related to the hang command 416 and halts the hang command 416.

Typically, debugging such issues requires careful review of source code, re-structuring of processes, and iterative long duration testing causing production to stall. In a live environment, source code access is not typically available. This increases issues with debugging and may increase resolution time by multitudes for an SoC such as the SoC 204 of FIG. 2. The SoC 302 of FIG. 3 allows for statistic generation during runtime which shortens debugging and resolution time.

Figure 5:
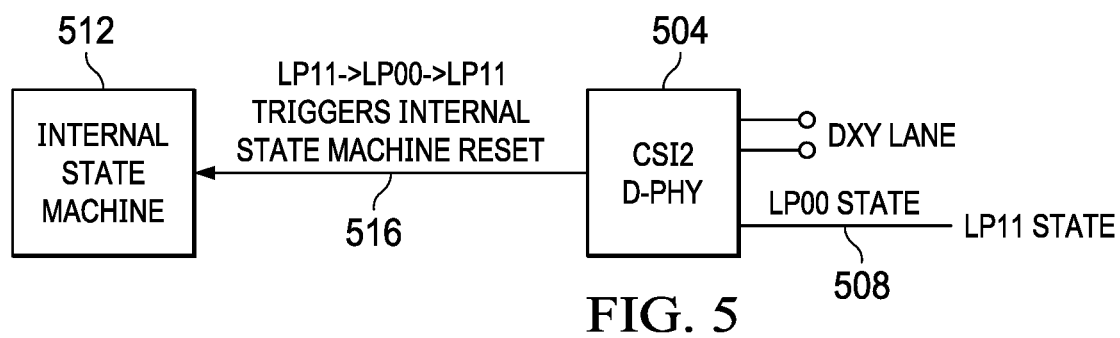
FIG. 5 is an example of a state machine reset process utilizing the system on a chip of FIG. 2.

In the example of FIG. 5, a receiver 504 uses an LP00 to LP11 transition 508 on a differential input/output pair to trigger an internal state machine 512 to reset. To achieve non-dependency of the external LP00 to LP11 trigger, the SoC 204 implemented logic on the input/outputs. In the example of FIG. 5, the logic carried out by the SoC 204 was broken and, thus, the LP11 state transition became a function of an external driver. The timing at which sensors drive LP00 versus an internal software trigger are scheduled become interdependent because of the LP11 transition fault. As a result, a race condition is introduced between the LP00 transition and the internal software trigger. In a condition where the LP00 transition wins the race condition, the internal software trigger is unable to notify the overseer 205. In these instances, the LP00 transition occurs and a fault occurs. With changes to the SoC 204, the race condition can be prevented from occurring at all.

In contrast, on example SoC 302 of FIG. 3 including the anomaly detector 304 and event processors 308a-g, the race condition could be prevented. The event processors 308a-g allow for I/O observability and identification of a fault in the LP00 to LP11 transition 508 by the anomaly detector 304. The anomaly detector 304 may halt the process in response to the identification of the fault.

Figure 6:
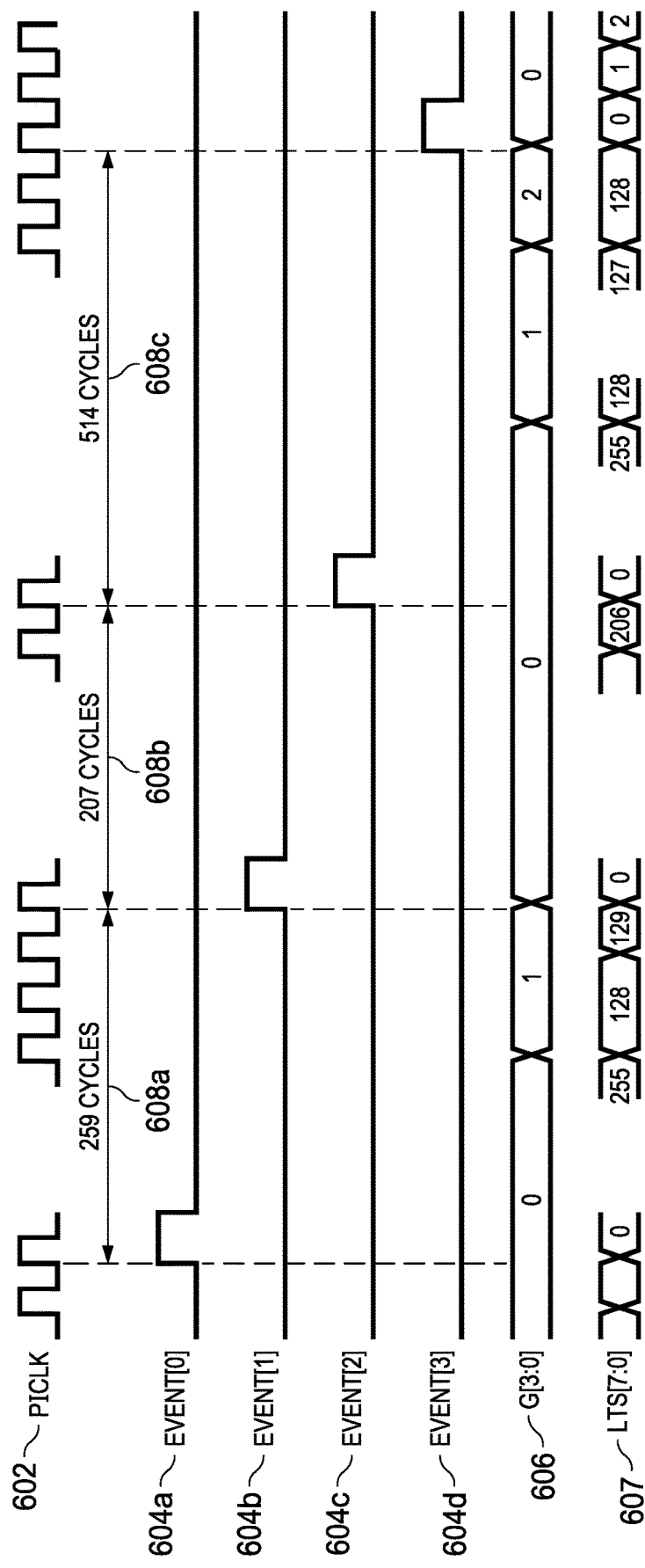
FIG. 6 is an example signal diagram of various components of the system on a chip of FIG. 3.

FIG. 6 is an example signal diagram. A processor internal clock (PICLK) 602 signal represented the clock of the processor 306 on the SoC 302. The PICLK 602 provides a clock rate for the SoC 302 and dictates the frequency at which components on the SoC 302 may operate. Components on the SoC 302 may alter, output, or operate at the change from high to low, or low to high, on the PICLK 602.

The signal diagram of FIG. 6 includes signal charts for four example events (e.g., Event[0] 604a, Event[1] 604b, Event[2] 604c, Event[3] 604d). Event[3:0] 604a-d may be inputs, outputs, triggers, or operations performed by a component on the SoC 302. When an event occurs, for instance an event associated with signal Event[0] 604a, the respective signal changes from a value of zero to a value of one for some pre-determined value of time. This pre-determined value of time can be how long the event is active, a certain number of clock cycles, or a certain amount of time.

G[3:0] 606 and LTS[7:0] 607 work together to count the number of clock cycles 608a-c between event occurrences in Event[3:0] 604a-d. LTS [7:0] 607 counts in binary to a max of 255. If an event occurrence in one of Event[3:0] 604a-d does not occur by the time LTS[7:0] 607 reaches 255 (e.g., 256 clock cycles have transpired by PICLK 602), LTS[7:0] 607 resets to 128 and G[3:0] increases by one. If an event occurs in one of Event[3:0] 604a-d, the values of LST[7:0] 607 and G[3:0] reset to zero. In some examples, the value of LTS[7:0] 607 takes one plus the current value of G[3:0] clock cycles to increase by one. For instance, if the current value of G[3:0] is one and the current value of LST[7:0] 607 is 140, two clock cycles must pass before the value of LST[7:0] 607 increases to 141. The LTS[7:0] 607 takes one plus the current value of G[3:0] 606 clock cycles to increase by one to prevent G[3:0] 606 from overflowing. The time required for G[3:0] 606 increases dramatically when compared to an example where the LST[7:0] 607 takes one clock cycle to increase without checking the G[3:0] 606.

When an event occurs, an event processor 308 acquires knowledge of the event occurring as the component on the SoC 302 must transmit the event through the event processors 308a-g. The event processors 308a-g acquire statistics pertaining to the event, such as a timestamp, the event input, the event output, the event runtime, and the clock cycles since a last event. The event processor 308 includes knowledge about when a possible error could have occurred. For example, the event processor 308 may know that when Event[0] 604a triggers, at least three hundred clock cycles must pass before Event[1] 604b triggers. In the example of FIG. 6, Event[1] 604b triggers 259 clock cycles after Event [0]. In this example, the event processor 308 identifies a possible error to have occurred and generates an output to transmit to the anomaly detector 304 to analyze. The anomaly detector 304 may alter the process on the SoC 302 based on the output.

Figure 7:
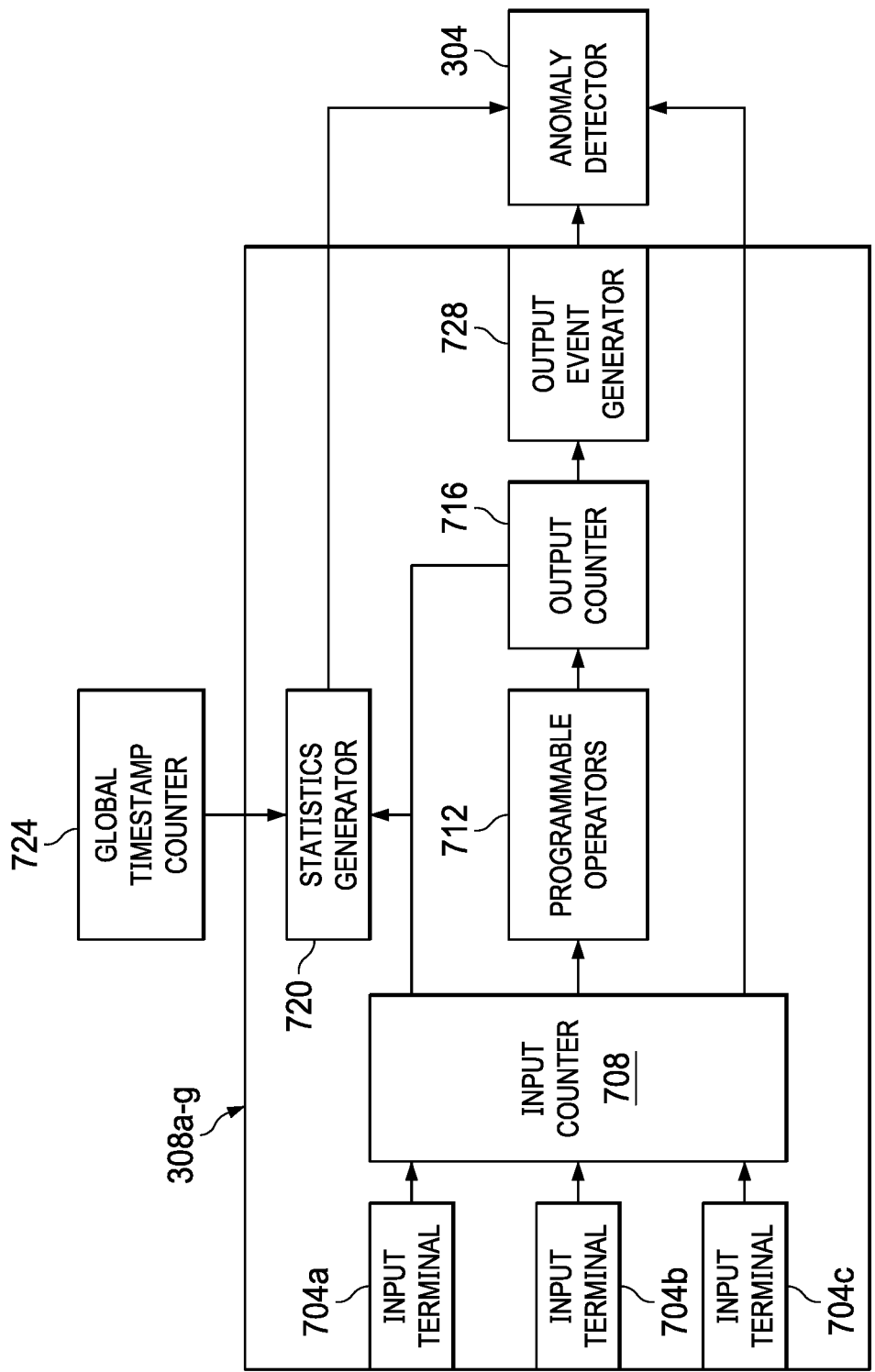
FIG. 7 is a block diagram of an example event processor.

FIG. 7 is a block diagram of an example of the event processor 308 hardware. The event processor 308 receives input from various components of the SoC 302, including signals to and from the respective HWA, and determines whether an anomaly has occurred in the SoC 302 process based on the inputs. The event processor 308 generates an output event when an anomaly threshold has been met and transmits the output event to an example anomaly detector 304. The event processor 308 includes example input terminals 704a-c, an example input counter 708, example programmable operators 712, an example output counter 716, an example statistics generator 720, and an example output event generator 728.

The event processor 308 includes at least one input terminal 704a-c. Input terminals 704a-c can retrieve external inputs to the SoC 302, outputs from the SoC 302, inputs to various components on the SoC 302, or outputs from various components on the SoC 302. The event processor 308 retrieves the at least one input via the input terminals 704a-c.

The example input counter 708 of the event processor 308 retrieves information via the input terminals 704a-c. The input counter 708 may be programmed to count transitions, duration, and/or other aspects of the respective signals received by the input terminals 704a-c. The input counter 708 may also be programmed to perform thresholding of each of the respective counts, and in response to an input count threshold being met, the input counter 708 may transmit a corresponding count signal to a set of programmable operators 712 and an example statistics generator 720. Also, in these examples, the input counter 708 transmits the inputs to an example anomaly detector 304.

The programmable operators 712 of the event processor 308 receive the first set of count signals produced by the input counter 708. The programmable operators 712 conduct operations on the first set of count signals to detect relationships between the different count signals. In this way, the event processor 308 can provide a configurable event detection algorithm specific to its HWA without processor involvement. In some examples, the programmable operators 712 include programmable logic such as ANDs, NORs, NANDs, and ORs. In other examples, the programmable operators 712 include or do not include at least one of the ANDs, NORs, NANDs, and/or ORs. The programmable operators 712 conduct the operations on the first set of count signals and transmits a set of event detection signals to an output counter 716.

The example output counter 716 of the event processor 308 retrieves the event detection signals that result from the operations of the programmable operators 712. In some examples, the output counter 716 may be programmed to count transitions, durations, and/or other aspects of the event detection signals and determine whether an output threshold has been satisfied. In these examples, the output counter 716 transmits a result second set of count signals to an example output event generator 728. Also in these examples, the output counter 716 transmits the second set of count signals to the statistics generator 720.

The statistics generator 720 of the event processor 308 retrieves the inputs, various intermediate signals (such as the first set of count signals from the input counter 708, and/or the second set of count signals from the output counter 716), and a current timestamp from an example global timestamp counter 724. The statistics generator 720 generates statistics based on the retrieved data. In some examples, the statistics generator 720 creates data detailing when inputs are received, when thresholds are met, and what the event processor 308 has output. In these examples, the statistics generator 720 includes the timestamp of the events occurring by retrieving the current timestamp from the global timestamp counter 724. In some examples, the statistics include, but are not limited to, time relation between input events, output events, and all events. The statistics may also include a minimum, a maximum, an average, and a histogram generation for selected events.

The example global timestamp counter 724 contains a counter indicating the current timestamp for the SoC 302. In response to the statistics generator 720 requesting the current timestamp, the global timestamp counter 724 transmits the current time in a timestamp to the statistics generator 720.

The example output event generator 728 of the event processor 308 generates output events based on the results of the operations of the programmable operators 712 in response to receiving a notification from the output counter 716 that an output threshold has been satisfied. The output event generated by the output event generator 728 can include information indicating the inputs that triggered the output threshold, the current timestamp, and the operations that were conducted. The output event generator 728 transmits the output event to the example anomaly detector 304.

The anomaly detector 304 retrieves the inputs from the input counter 708 and the output events from the output event generator 728. The anomaly detector 304 analyzes the inputs and the output event to determine if an anomaly has occurred and, in response to determining an anomaly has occurred, to determine if the anomaly is an error. In response to determining that the anomaly is an error, the anomaly detector 304 can alter the process taking place in the SoC 302 to improve performance of the process in the SoC 302. In some examples, the anomaly detector 304 is a state machine. In other examples, the anomaly detector 304 is an auto-encoder.

Figure 8:
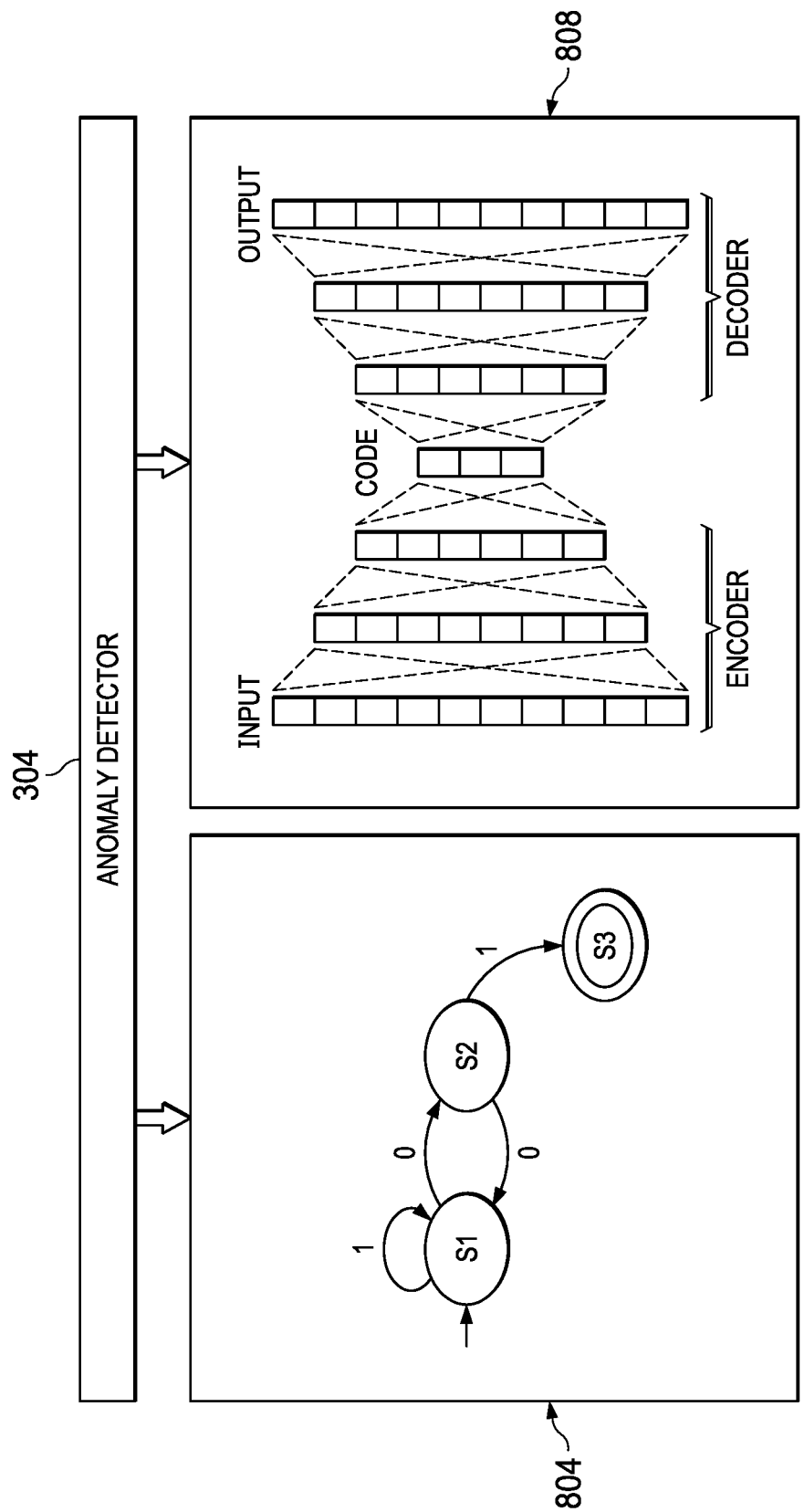
FIG. 8 is a diagram showing example operations of the anomaly detection of FIGS. 3 and 7.

FIG. 8 is a diagram of possible embodiments of the anomaly detector 304 of FIG. 7. In some examples, the anomaly detector 304 is a traditional state machine 804. In other examples, the anomaly detector 304 is an auto-encoder 808. The traditional state machine 804 consists of a plurality of possible states that the anomaly detector 304 can be in. Based on inputs to the anomaly detector 304, the traditional state machine 804 can change states. In some examples, the inputs cause the traditional state machine 804 to move to a state that indicates an error has occurred. In these examples, the anomaly detector 304 outputs that an error has occurred and determines a way to alter the process in the SoC 302 to prevent the error from occurring further.

In other examples, the anomaly detector 304 is an auto-encoder 808. The auto-encoder 808 is an artificial intelligence that determines a representation for a set of data. In these examples, the set of data is input to the anomaly detector 304. The auto-encoder 808 can identify when an error has occurred based on detected representations of the input. In response to the auto-encoder 808 determining an error has occurred, the anomaly detector 304 outputs a statement showing that an error has occurred and alters the process in the SoC 302 to prevent the error from occurring further.

Figure 9:
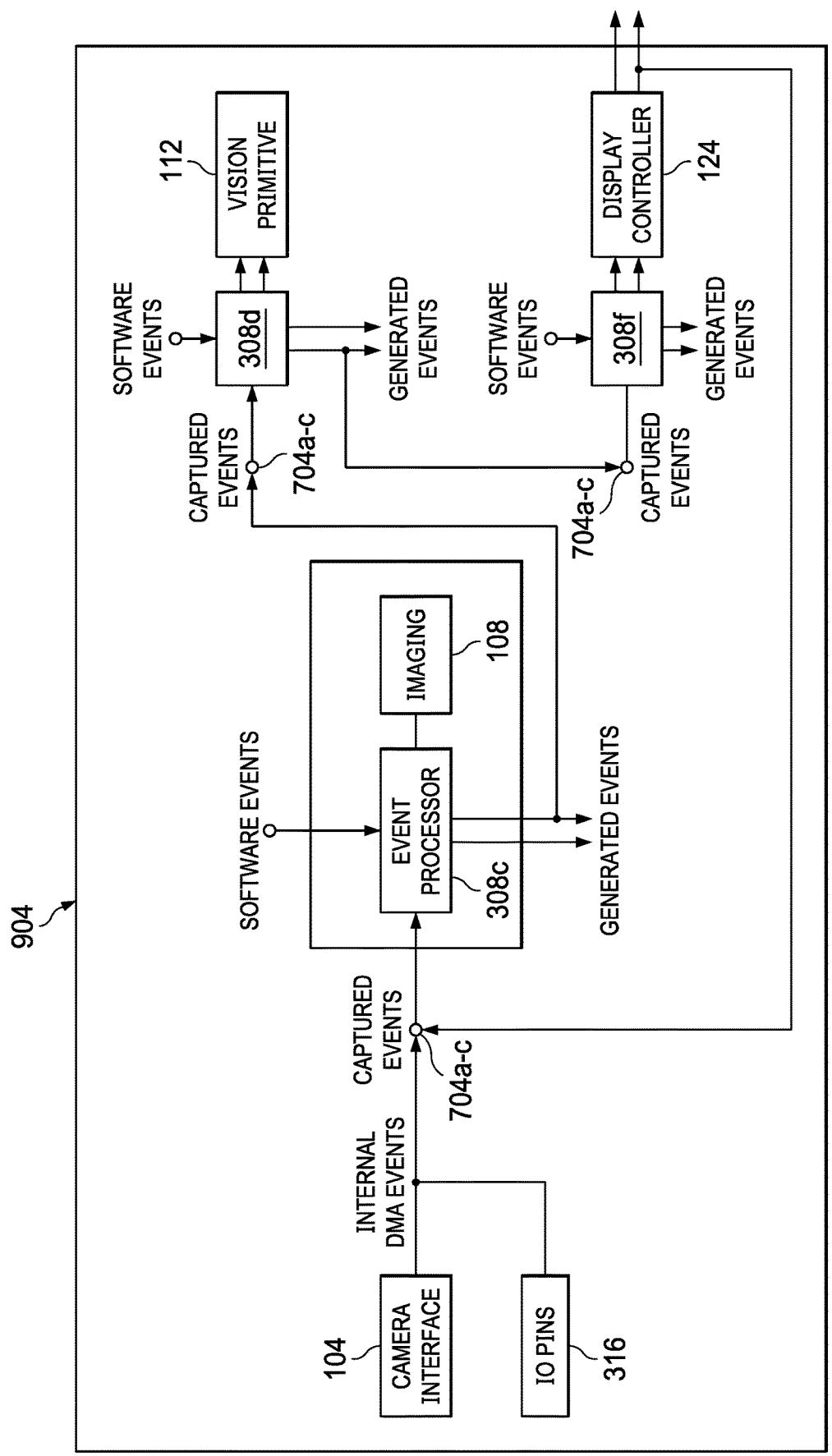
FIG. 9 is a block diagram of an example of a system on a chip including the example of the event processor hardware.

FIG. 9 is a block diagram of an example of a SoC 904 including the example of the event processor 308 hardware. In the provided example, the SoC 904 includes the example camera interface 104, the example imaging unit 108, the example vision primitive unit 112, the example display controller 124, an example event processor 308c, 308d, 308f for some of the components, and example IO pins 316. The example event processor 308c, 308d, 308f capture inputs from various components on the SoC 904 via the input terminals 704a-c and determine whether an error has occurred. The captured inputs transmit through the event processor 308c, 308d, 308f before reaching an intended target (e.g., imaging unit 108, vision primitive unit 112, display controller 124, etc.). The SoC 904 is an example system on a chip. Other SoCs may include or not include any of the components shown in previous figures.

Figure 10:
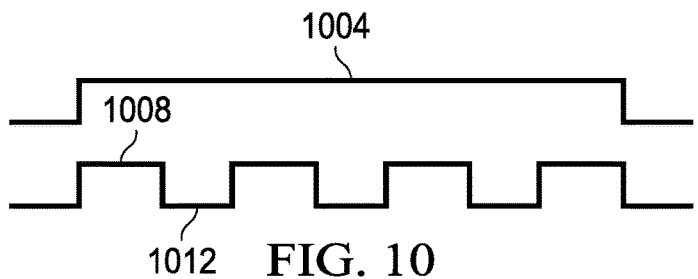
FIG. 10 is an example timing diagram of a component of a system on a chip.

FIG. 10 is an example timing diagram of the hardware accelerator (HWA). In the timing diagram, an example HWA is one of the components on the SoC 302 (e.g., camera interface 104, imaging unit 108, vision primitive unit 112, deep learning unit 116, computer vision unit 120, display controller 124, etc.). The anomaly detector 304 utilizes information concerning when the HWA is active to determine how to optimize the process on the SoC 302. The anomaly detector 304 determines when the HWA was active 1004, 1008 or inactive 1012. In some instances, an HWA is active 1004 for an extended period. In other instances, an HWA alternates between active 1008 and inactive 1012 states. The anomaly detector 304 determines whether the utilization of the HWA is greater than a high risk threshold. If the anomaly detector 304 determines that an HWA utilization is greater than the high risk threshold, the anomaly detector 304 reduces the usage of the specified HWA. The anomaly detector 304 also determines whether the utilization of an HWA is less than a low risk threshold. In response to determining that the utilization of an HWA is less than the low risk threshold, the anomaly detector 304 increases the usage of the HWA.

In response to determining that the HWA usage is less than the high risk threshold and more than the low risk threshold, the anomaly detector 304 does not alter the utilization of the HWA. If the anomaly detector 304 determines that an alteration to the usage of the HWA is necessary, the anomaly detector 304 alters the usage of the HWA based on the threshold being satisfied and statistics generated from previous anomaly events.

Figure 11:
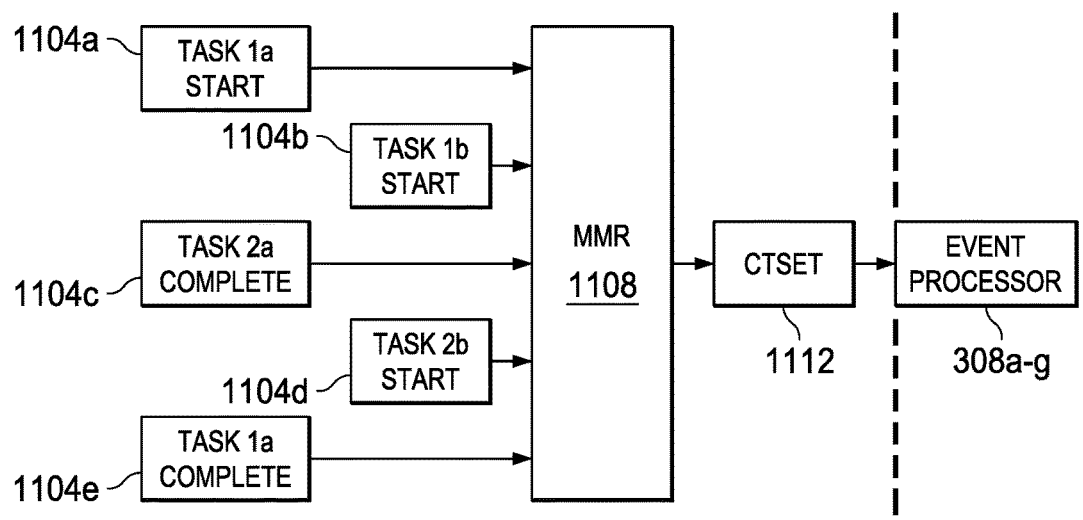
FIG. 11 is a diagram showing an example input stream from a register to the event processor.

FIG. 11 is a diagram showing an example system flow between registers. In some examples, task events 1104a-e are transmitted via a memory-mapped register (MMR) 1108. The MMR 1108 may be an example of the on-chip memory 210 or the external memory 212 of FIGS. 2 and 3. The task events 1104a-e include, but are not limited to, tasks beginning 1104a, 1104b and 1104d, tasks completing 1104c and 1104e, and tasks failing. The MMR 1108 then transmits the task events to an example system event trace module (CTSET) 1112. In some examples, the example SoC 302 of FIG. 3 includes a CTSET to determine the origins of events. The example CTSET 1112 accesses the task events 1104a-e and determines the origins of the task events 1104a-e. The CTSET 1112 provides a mechanism to enable software debug on multi-core and distributed systems. The CTSET 1112 also allows for real-time profiling of specific tasks or transactions across cores with a singular timestamp. Transmitting the task events 1104a-e via the MMR 1108 allows for the CTSET to retrieve the task events 1104a-e. The CTSET 1112 then transmits the task events 1104a-e to an example event processor 308 for quality analysis. FIG. 11 is an example of a system that can be monitored by an event processor 308. The system of FIG. 11 benefits from the improvements of the SoC 302 due to the addition of the event processors 308a-g.

While an example manner of implementing the event processor 308 of FIG. 3 is illustrated in FIG. 7, one or more of the elements, processes and/or devices illustrated in FIG. 7 may be combined, divided, re-arranged, omitted, eliminated and/or implemented in any other way. Further, the example input terminals 704a-c, the example input counter 708, the example programmable operators 712, the example output counter 716, the example statistics generator 720, the example global timestamp counter 724, the example output event generator 728, the example anomaly detector 304 and/or, more generally, the example event processor 308 of FIG. 3 may be implemented by hardware, software, firmware and/or any combination of hardware, software and/or firmware. Thus, for example, any of the example input terminals 704a-c, the example input counter 708, the example programmable operators 712, the example output counter 716, the example statistics generator 720, the example global timestamp counter 724, the example output event generator 728, the example anomaly detector 304 and/or, more generally, the example event processor 308 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

When reading any of the apparatus or system claims of this patent to cover a purely software and/or firmware implementation, at least one of the example input terminals 704a-c, the example input counter 708, the example programmable operators 712, the example output counter 716, the example statistics generator 720, the example global timestamp counter 724, the example output event generator 728, the example anomaly detector 304 is/are hereby expressly defined to include a non-transitory computer readable storage device or storage disk such as a memory, a digital versatile disk (DVD), a compact disk (CD), a Blu-ray disk, etc. including the software and/or firmware. Further still, the example event processor 308 of FIG. 3 may include one or more elements, processes and/or devices in addition to, or instead of, those illustrated in FIG. 7, and/or may include more than one of any or all of the illustrated elements, processes and devices.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 12:
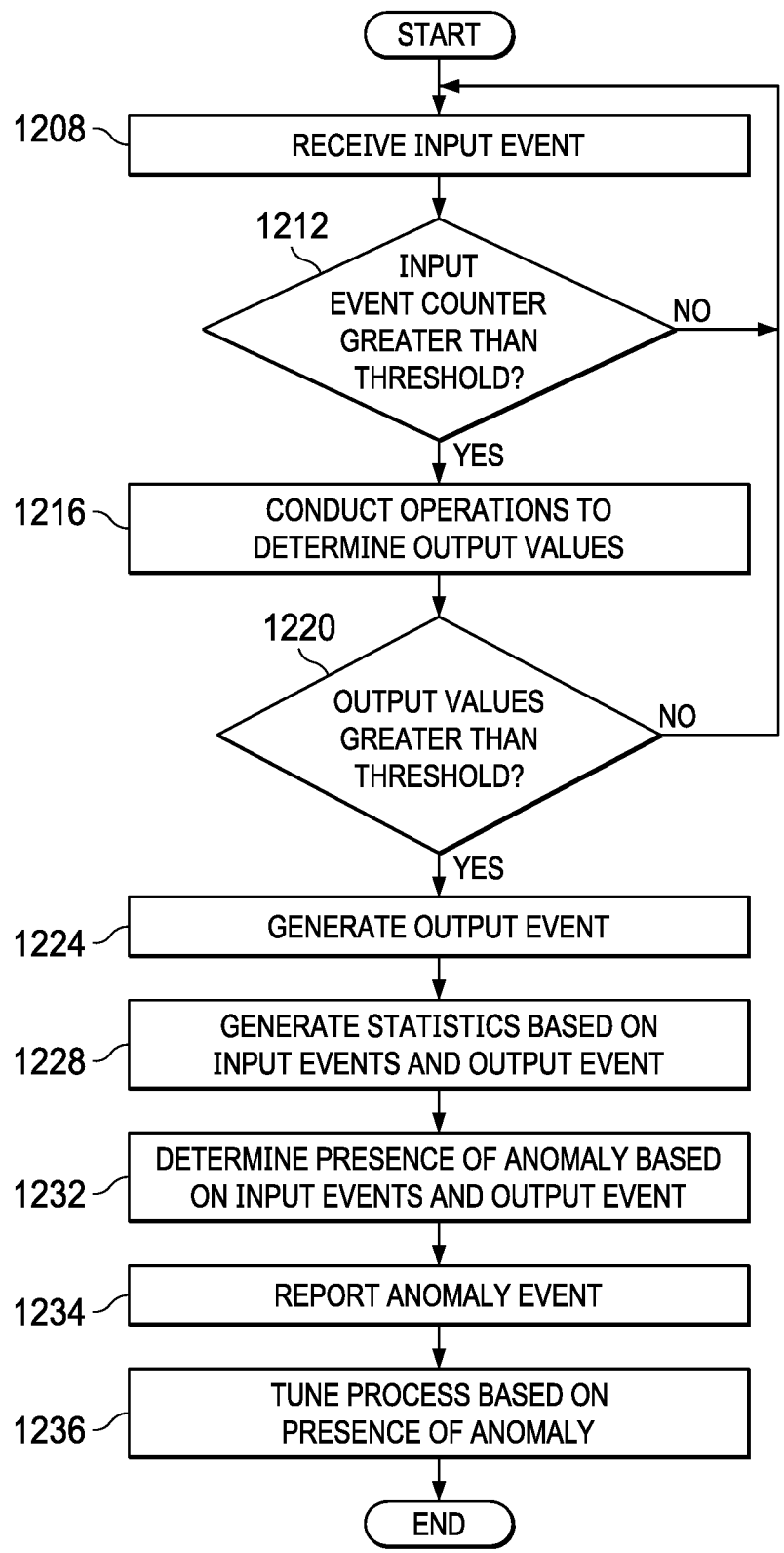
FIG. 12 is a flowchart representative of machine readable instructions which may be executed to implement the event processor.

A flowchart representative of example hardware logic, machine readable instructions, hardware implemented state machines, and/or any combination thereof for implementing the example event processor 308 of FIG. 3 is shown in FIG. 12. The machine readable instructions may be one or more executable programs or portion(s) of an executable program for execution by a computer processor and/or processor circuitry, such as the processor 1312 shown in the example processor platform 1300 discussed below in connection with FIG. 13. The program may be embodied in software stored on a non-transitory computer readable storage medium such as a CD-ROM, a floppy disk, a hard drive, a DVD, a Blu-ray disk, or a memory associated with the processor 1312, but the entire program and/or parts thereof could alternatively be executed by a device other than the processor 1312 and/or embodied in firmware or dedicated hardware.

Further, although the example program is described with reference to the flowchart illustrated in FIG. 12, many other methods of implementing the example event processor 308 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 12 is a flowchart representative of machine readable instructions which may be executed to implement the event processor 308. The process begins at block 1208, the event processor 308 receives and/or otherwise retrieves at least one input via the input terminals 704a-c. The input counter 708 retrieves the inputs via the input terminals 704a-c. The process proceeds to block 1212.

At block 1212, the input counter 708 determines whether an input threshold has been satisfied. The input threshold can be a pre-determined value based on the process running on the SoC 302. In response to determining that the input threshold has been satisfied, the process proceeds to block 1216. In response to determining that the input threshold has not been satisfied, the process returns to block 1208.

At block 1216, the programmable operators 712 conducts operations on the input events to determine an output value. The operations conducted on the input events include, but are not limited to, ANDs, ORs, NANDs, and/or NORs. Not all of the operations must be included. The programmable operators 712 determines which operations to conduct on the input events based on the source of the input event. For instance, an input event from imaging unit 108 would have different operations conducted on the input event than an input event from a source external to the SoC 302. The process proceeds to block 1220.

At block 1220, the output counter 716 counts the output value and determines whether an output threshold has been satisfied. The output threshold is based on a pre-determined value that is based on the processes being conducted on the SoC 302. The output value satisfies the output threshold when a specified amount of output value is reached within a specified amount of time. This threshold and time value are not limited to one value. In response to determining that the output threshold has been satisfied, the process proceeds to block 1224. In response to determining that the output threshold has not been satisfied, the process returns to block 1208.

At block 1224, the output event generator 728 generates an output event. The output event is based on the input and the output value. The output event generator 728 transmits the output event to the anomaly detector 304. The process proceeds to block 1228.

At block 1228, the statistics generator 720 generates statistics based on the output values and the inputs. The statistics generator 720 retrieves the current timestamp from the global timestamp counter 724. The statistics generator 720 utilizes the current timestamp to define the statistics for the retrieved inputs. The generated statistics may include a minimum, a maximum, an average, and a histogram for selected events. The process proceeds to block 1232.

At block 1232, the anomaly detector 304 determines whether an error has occurred based on the output event and the input. The anomaly detector 304 retrieves the inputs from the input counter 708 and the output events from the output event generator 728. The anomaly detector 304 analyzes the inputs and the output event to determine if an anomaly has occurred and, in response to determining an anomaly has occurred, to determine if the anomaly is an error. The process proceeds to block 1234.

At block 1234, the anomaly detector 304 reports the anomaly. In some examples, the anomaly detector 304 creates a prompt for a user. In other examples, the anomaly detector 304 transmits a message to a user. The process proceeds to block 1236.

At block 1236, in response to determining that the anomaly is an error, the anomaly detector 304 can alter the process taking place in the SoC 302 to improve performance of the process in the SoC 302. The anomaly detector 304 utilizes information concerning when a hardware accelerator (HWA) is active to determine how to optimize the process on the SoC 302. In these examples, the HWA is one of the various components on the SoC 302 (e.g., camera interface 104, imaging unit 108, vision primitive unit 112, deep learning unit 116, computer vision unit 120, display controller 124, etc.). The anomaly detector 304 determines when the HWA was active or inactive. The anomaly detector 304 determines whether the utilization of the HWA is greater than a high risk threshold. If the anomaly detector 304 determines that an HWA utilization is greater than the high risk threshold, the anomaly detector 304 reduces the usage of the specified HWA. The anomaly detector 304 also determines whether the utilization of an HWA is less than a low risk threshold. In response to determining that the utilization of an HWA is less than the low risk threshold, the anomaly detector 304 increases the usage of the HWA.

In response to determining that the HWA usage is less than the high risk threshold and more than the low risk threshold, the anomaly detector 304 does not alter the utilization of the HWA. If the anomaly detector 304 determines that an alteration to the usage of the HWA is necessary, the anomaly detector 304 alters the usage of the HWA based on the threshold being satisfied and statistics generated from previous anomaly events. The process ends.

Figure 13:
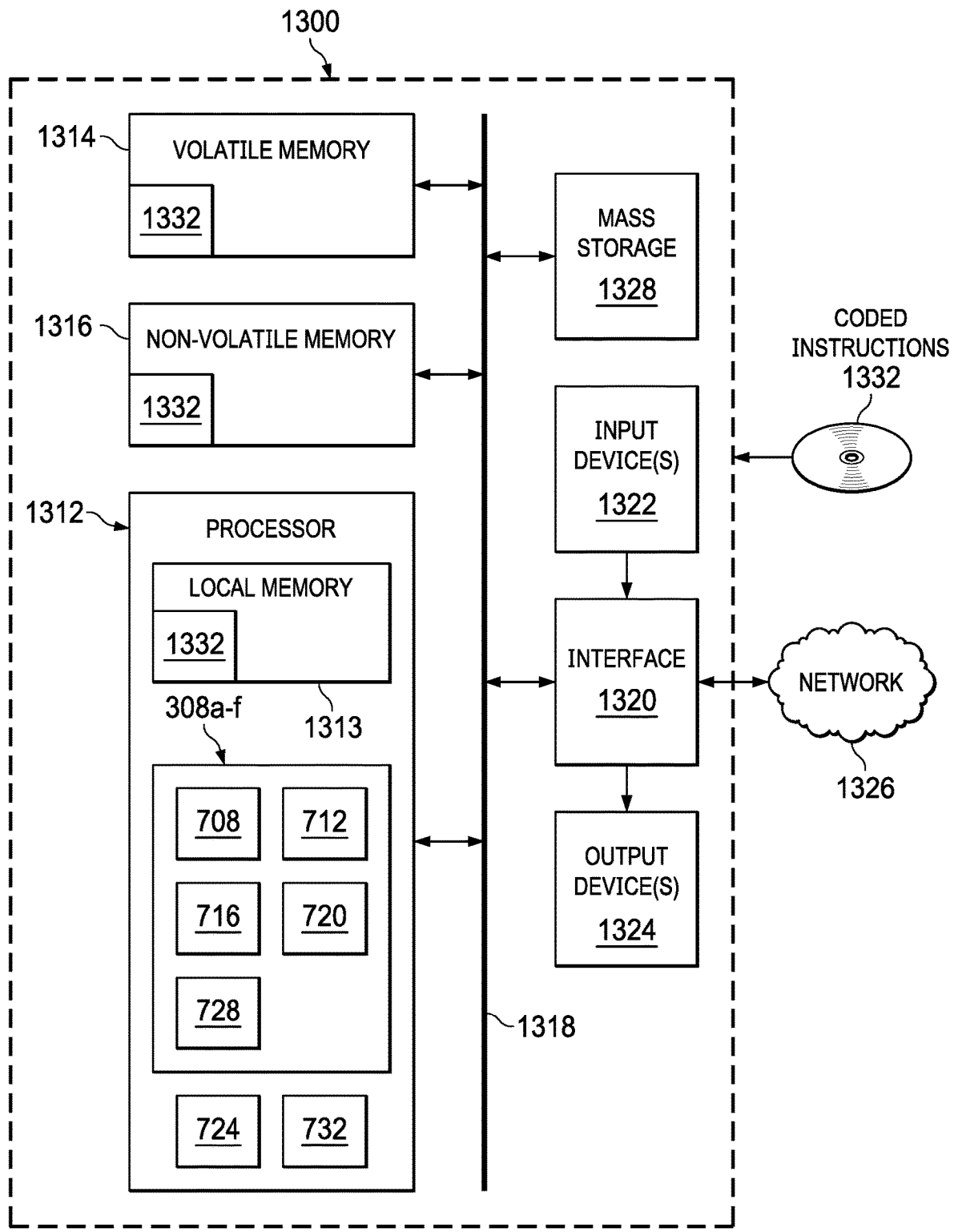
FIG. 13 is a block diagram of an example processing platform structured to execute the instructions of FIG. 12 to implement an example event processor.

FIG. 13 is a block diagram of an example processor platform 1300 structured to execute the instructions of FIG. 12 to implement the event processor 308 of FIG. 7. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements an example input counter 708, example programmable operators 712, an example output counter 716, an example statistics generator 720, an example global timestamp counter 724, an example output event generator 728, and an example anomaly detector 304.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives.

The machine executable instructions 1332 of FIG. 12 may be stored in the mass storage device 1328, in the volatile memory 1314, in the non-volatile memory 1316, and/or on a removable non-transitory computer readable storage medium such as a CD or DVD.

Figure 14:
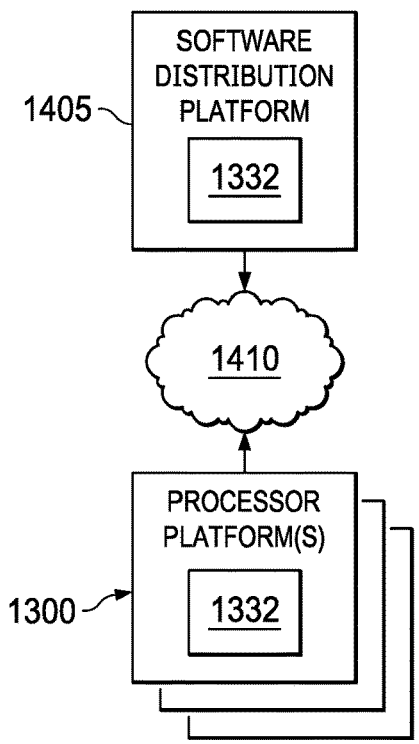
FIG. 14 is a block diagram of an example software distribution platform to distribute software (e.g., software corresponding to the example computer readable instructions of FIG. 12) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1405 to distribute software such as the example computer readable instructions 1332 of FIG. 13 to third parties is illustrated in FIG. 14. The example software distribution platform 1405 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1332 of FIG. 13. The third parties may be consumers, users, retailers, OEMs, etc., who purchase and/or license the software for use and/or re-sale and/or sub-licensing. In the illustrated example, the software distribution platform 1405 includes one or more servers and one or more storage devices. The storage devices store the computer readable instructions 1332, which may correspond to the example computer readable instructions of FIG. 12, as described above. The one or more servers of the example software distribution platform 1405 are in communication with a network 1410, which may correspond to any one or more of the Internet and/or any of the example networks 1326 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1332 from the software distribution platform 1405. For example, the software, which may correspond to the example computer readable instructions of FIG. 12, may be downloaded to the example processor platform 1300, which is to execute the computer readable instructions 1332 to implement the anomaly detector 504. In some example, one or more servers of the software distribution platform 1405 periodically offer, transmit, and/or force updates to the software (e.g., the example computer readable instructions 1332 of FIG. 13) to ensure improvements, patches, updates, etc. are distributed and applied to the software at the end user devices.

From the foregoing, it will be appreciated that example methods, apparatus and articles of manufacture have been disclosed that provide low latency fault mitigation, quality of service management, and debugging of complex processing pipeline issues. The disclosed methods, apparatus and articles of manufacture improve the efficiency of using a computing device by lowering latency of error detection, lowering CPU overhead committed to error detection, and mitigating conditions that could lead to a system-wide failure. The disclosed methods, apparatus and articles of manufacture are accordingly directed to one or more improvement(s) in the functioning of a computer.

Example methods, apparatus, systems, and articles of manufacture to have low latency fault mitigation, quality of service management, and debug of a processing pipeline are disclosed herein. Further examples and combinations thereof include the following:

Example 1 includes an apparatus for a system on a chip (SoC) comprising a set of hardware accelerators (HWAs), a set of event processors coupled to the HWAs such that each of the event processors is coupled to a respective HWA of the set of HWAs, and an anomaly detector coupled to the set of event processors.

Example 2 includes the apparatus of example 1, wherein an event processor in the set of event processor includes at least one input terminal, an input counter, programmable operators, an output counter, a statistics generator, and an output event generator.

Example 3 includes the apparatus of example 2, wherein the programmable operators include at least one of bitwise AND, bitwise OR, bitwise XOR, bitwise NOT, bitwise NAND, or bitwise NOR.

Example 4 includes the apparatus of example 1, the SoC including a first bus to transmit data between the set of HWAs, and a second bus to transmit data between the set of event processors and the anomaly detector.

Example 5 includes the apparatus of example 1, the SoC including a processor coupled to the anomaly detector.

Example 6 includes the apparatus of example 1, the set of event processors to retrieve an input event, and generate an output event based on the input event, in response to a determination that an input event threshold is exceeded within a threshold of time.

Example 7 includes the apparatus of example 1, wherein the set of event processors receive a input event, the input event is at least one of an external input to the SoC, an output from the SoC, an input to one of the HWAs in the set of HWAs, or an output from one of the HWAs in the set of HWAs.

Example 8 includes the apparatus of example 1, the anomaly detector to retrieve an output event from an event processor in the set of event processors, and determine whether the output event indicates threat to functional safety of the SoC.

Example 9 includes the apparatus of example 8, the anomaly detector to, in response to determining the output event indicates a threat to functional safety of the SoC, adapt a process for the SoC to preserve functional safety.

Example 10 includes the apparatus of example 9, the anomaly detector to determine whether utilization of one of the HWAs in the set of HWAs is greater than a high risk threshold, in response to the determination that the utilization of the HWA is greater than the high risk threshold, decrease the utilization of the HWA, determine whether the utilization of the HWA is less than a low risk threshold, in response to determining that the utilization of the HWA is less than the low risk threshold, increase the utilization the HWA, and in response to determining that the utilization of the HWA is greater than the low risk threshold and less than the high risk threshold, perform no alteration to the utilization of the HWA.

Example 11 includes a method for an event processor comprising receiving a set of signals associated with processing by a hardware accelerator (HWA) on a system on a chip (SoC), performing a set of operations on the set of signals to determine whether an event occurred in the processing by the HWA, and providing a result of the set of operations that indicates whether the event occurred to an anomaly detector.

Example 12 includes the method of example 11, wherein the set of signals include at least one of an external input to the SoC, an output from the SoC, an input the HWA, or an output from the HWA.

Example 13 includes the method of example 11 further comprising performing a plurality of instances of the set of operations on respective sets of signals in parallel using a plurality of event processors, each associated with a respective HWA.

Example 14 includes the method of example 11, wherein the set of operations are performed using programmable operators that include at least one of bitwise AND, bitwise OR, bitwise XOR, bitwise NOT, bitwise NAND, or bitwise NOR.

Example 15 includes the method of example 11, including generating statistics based on the signals and the results of the operations, the statistics including a maximum, a minimum, an average, and a relationship between the set of signals and the result of the operations.

Example 16 includes the method of example 11, including a method for the anomaly detector including retrieving the result of the operations, and determining whether the result of the operations indicate threat to the SoC.

Example 17 includes the method of example 16, including, in response to determining the result of the operations indicates threat to functional safety of the SoC, adapt a process for the SoC to preserve functional safety.

Example 18 includes the method of example 16, including determining whether utilization of the HWA is greater than a high risk threshold, in response to the determination that the utilization the HWA is greater than the high risk threshold, decreasing the utilization of the HWA, determining whether the utilization the HWA is less than a low risk threshold, in response to determining that the utilization the HWA is less than the low risk threshold, increasing the utilization of the HWA, and in response to determining that the utilization the HWA is greater than the low risk threshold and less than the high risk threshold, performing no alteration to the utilization of the HWA.

Example 19 includes the method of example 11, wherein the event processor can be programmably configured to detect events.

Example 20 includes the method of example 11, further including transmitting the results of the operations to the anomaly detector via a data bus.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus for a system on a chip (SoC) comprising:
   a data bus;
   a set of hardware accelerators (HWAs);
   a set of event processors coupled to the set of HWAs such that each event processor of the set of event processors is coupled between a respective HWA of the set of HWAs and the data bus, wherein each event processor of the set of event processors is configured to detect events associated with the respective HWA; and
   an anomaly detector coupled to each event processor of the set of event processors, wherein the anomaly detector is configured to perform a safety check routine to preserve functional safety in response to determining that events detected by a first event processor of the set of event processors indicates a functional safety risk with respect to the SoC, the safety check routine including determining, by the anomaly detector, a risk factor with respect to continued utilization of a first HWA of the set of HWAs, and controlling utilization of the first HWA based on the determined risk factor.

2. The apparatus of claim 1, wherein the first event processor in the set of event processors includes at least one input terminal, an input counter, programmable operators, an output counter, a statistics generator, and an output event generator.

3. The apparatus of claim 2, wherein the programmable operators include at least one of bitwise AND, bitwise OR, bitwise XOR, bitwise NOT, bitwise NAND, or bitwise NOR.

4. The apparatus of claim 1 further comprising:
   an event bus to transmit data between event processors of the set of event processors and the anomaly detector.

5. The apparatus of claim 1 further comprising a processor coupled to the anomaly detector.

6. The apparatus of claim 1, wherein each event processor of the set of event processors is configured to:
   detect a first event associated with the respective HWA;
   determine whether a second event associated with the respective HWA occurs within a threshold of time; and
   based on the second event not occurring within the threshold of time, provide an output to the anomaly detector.

7. The apparatus of claim 6, wherein the first event is associated with at least one of an external input to the SoC, an output from the SoC, an input to the respective HWA, or an output from the respective HWA.

8. The apparatus of claim 1, wherein in determining the risk factor with respect to continued utilization of the first HWA of the set of HWAs, and controlling utilization of the first HWA based on the determined risk factor, the anomaly detector is configured to:
   determine whether utilization of the first HWA of the set of HWAs is greater than a high risk threshold;
   in response to the determination that the utilization of the first HWA is greater than the high risk threshold, decrease the utilization of the first HWA;
   determine whether the utilization of the first HWA is less than a low risk threshold;
   in response to determining that the utilization of the first HWA is less than the low risk threshold, increase the utilization the first HWA; and
   in response to determining that the utilization of the first HWA is greater than the low risk threshold and less than the high risk threshold, perform no alteration to the utilization of the first HWA.

9. A method for an event processor comprising:
   receiving signals from a first hardware accelerator (HWA) of a set of hardware accelerators (HWAs) of a system on a chip (SoC) by an event processor coupled to the first HWA;
   performing, by the event processor, a set of operations on the signals to determine that an event occurred in processing by the first HWA; and
   providing, by the event processor, a result of the set of operations that indicates that the event occurred to an anomaly detector, wherein the anomaly detector is configured to perform a safety check routine to preserve functional safety in response to determining that the event detected by the event processor of the set of event processors indicates a functional safety risk with respect to the SoC, the safety check routine including determining, by the anomaly detector, a risk factor with respect to continued utilization of the first HWA, and controlling utilization of the first HWA based on the determined risk factor.

10. The method of claim 9, wherein the event is further based on at least one of an external input to the SoC, an output from the SoC, or an input the first HWA.

11. The method of claim 9 further comprising performing a plurality of instances of the set of operations on respective sets of signals received from respective HWAs of the set of HWAs in parallel using a plurality of event processors, each associated with a respective HWA.

12. The method of claim 9, wherein the set of operations are performed using programmable operators that include at least one of bitwise AND, bitwise OR, bitwise XOR, bitwise NOT, bitwise NAND, or bitwise NOR.

13. The method of claim 9 further comprising generating statistics based on the signals and the results of the operations, the statistics including a maximum, a minimum, an average, and a relationship between the set of signals and the result of the operations.

14. The method of claim 9, wherein the determining of the risk factor with respect to continued utilization of the first HWA, and controlling utilization of the first HWA based on the determined risk factor by the anomaly detector, further comprises:
   determining whether utilization of the first HWA is greater than a high risk threshold;
   in response to the determination that the utilization the first HWA is greater than the high risk threshold, decreasing the utilization of the first HWA;
   determining whether the utilization the first HWA is less than a low risk threshold;
   in response to determining that the utilization the first HWA is less than the low risk threshold, increasing the utilization of the first HWA; and
   in response to determining that the utilization the first HWA is greater than the low risk threshold and less than the high risk threshold, performing no alteration to the utilization of the first HWA.

15. The method of claim 9 further comprising programming the event processor to perform the set of operations to determine whether the event occurred.

16. The method of claim 9 further comprising transmitting the results of the operations to the anomaly detector via an event bus.

17. The method of claim 9, wherein, the determining of the risk factor with respect to continued utilization of the first HWA, and controlling utilization of the first HWA based on the determined risk factor by the anomaly detector, further comprises utilizing statistics from previous sets of operations performed by the event processor.

18. A system comprising:
   a set of hardware accelerators (HWAs);
   a set of event processors respectively coupled to the set of HWAs, each event processor of the set of event processors configured to detect events with respect to processing by the corresponding HWA;
   a bus coupled to each event processor of the set of event processors; and
   an anomaly detector coupled, via the bus, to each event processor of the set of event processors, wherein the anomaly detector is configured to:
      receive event detection signals from one or more event processors of the set of event processors via the bus,
      analyze the event detection signals to determine whether one or more HWAs of the set of HWAs is operating above a high-risk threshold and to determine whether one or more of the HWAs of the set of HWAs is operating below a low-risk threshold,
      decrease usage of any HWA determined to be operating above the high-risk threshold, and
      increase usage of any HWA determined to be operating below the low-risk threshold.

19. The system of claim 18, wherein the bus includes a data bus and an event bus, the event bus configured to carry the event detection signals.

20. The system of claim 18, wherein the system includes a system-on-a-chip (SoC).

21. The system of claim 18, wherein the set of HWAs and the set of event processors form part of a vision data flow pipeline.

22. The system of claim 18, wherein a first HWA of the set of HWAs in the vision data flow pipeline includes a camera interface configured to collect input data, and a last HWA of the set of HWAs in the vision data flow pipeline includes a display controller.

* * * * *